Figures 1, 2:
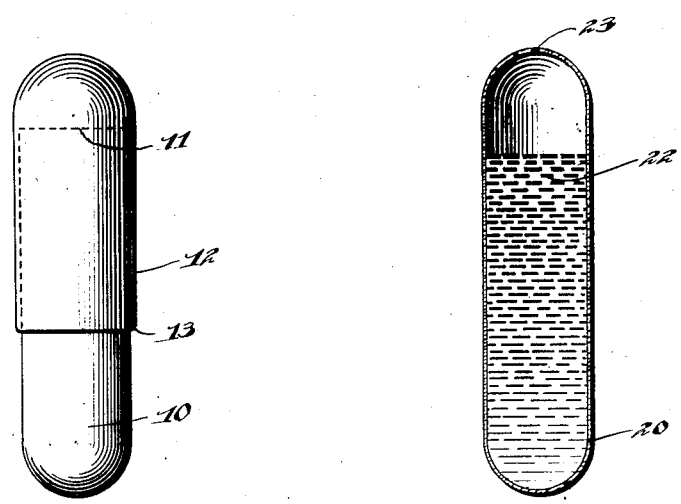

Oct. 14, 1930. G. H. LEE 1,778,264
INSOLUBLE CAPSULE
Filed Nov. 25, 1927

INVENTOR
G. H. Lee,
BY
ATTORNEY

Patented Oct. 14, 1930

1,778,264

UNITED STATES PATENT OFFICE

GEORGE H. LEE, OF OMAHA, NEBRASKA

INSOLUBLE CAPSULE

Application filed November 25, 1927. Serial No. 235,648.

This invention relates to a coating or container as a vehicle for medicines of internal application.

Medicines for destroying intestinal worms are of such a nature that they are dangerous to poultry when absorbed into the system through that part of the intestinal tract which is between the throat and gizzard. Medicines of this type which contain poisonous compounds are usually administered into the crop either in liquid form or in the form of capsules, tablets or pills and such medicine is very materially absorbed by the mucus membranes of the crop, the throat and the glandular stomach of the fowl. In view of the poisonous nature of the medicines which is required to destroy the worms, the fowls are frequently made quite sick and sometimes results in the death, especially if the condition caused by the worms is complicated with other diseases.

The crop, throat and glandular stomach of the fowls are rarely infested with worms so that the application of the medicines to these portions of the anatomy is unnecessary and should be applied to those parts, particularly the gizzard and the intestinal tract beyond the gizzard where they will be most effective for the purpose.

Furthermore, attempts have been made to treat the chickens by means of partially soluble capsules in order to carry the medicines beyond the throat and crop before they are released. However, the juices of the glandular stomach attack the coating or container forming the capsule so that the membranes of the glandular stomach will absorb too readily more or less of the poisonous ingredients.

An object of the invention is to provide a container in the form of a capsule or a coating for medicines of such character which is insoluble in the fluids associated with the throat, crop and glandular stomach of the fowls, but which may be broken in the gizzard due to the hard materials therein and the strong muscular action for breaking up hard particles so that the medicines may be directly applied to those parts which are infested with worms.

A further object of the invention is the provision of a vehicle for medicines adapted particularly for use in the treatment of worms which may be carried through the throat, crop and glandular stomach without being absorbed, but which will be broken up by the action of the hard particles and the muscles of the gizzard.

This invention will be best understood from a consideration of the following detailed description in connection with the accompanying drawings, nevertheless, it is to be understood that the invention is not confined to the disclosure being susceptible of such changes and modifications as shall define no material departure from the salient features of the invention as expressed in the appended claim.

In the drawings:—

Figure 3:
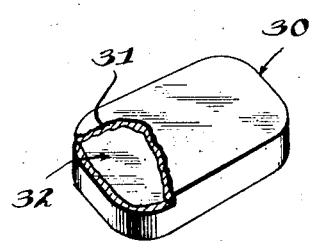

Figure 1 is a view in elevation of a capsule constructed according to the principles of my invention, Figure 2 is a vertical section of a container formed of insoluble materials, Figure 3 is a view in perspective of a tablet or pill having a coating thereon which is insoluble in the digestive fluids of a fowl.

Referring more particularly to the drawings, 10 designates a container forming a section of a capsule which has an open end 11 to receive the medicinal imgredients and which is normally closed by the cover 12. The inner end of the cover, as shown at 13, is rounded so that the capsule may be readily swallowed and passed from the throat to the gizzard without causing any obstruction. This capsule is formed of some material which is insoluble in the digestive fluids of the intestinal tract of the fowl in order to prevent dissolution of the capsule before the same has reached the gizzard. In this manner the medicines which have been filled in the container 10 are sealed against contact with the throat, crop and glandular stomach.

A modified form is shown in Fig. 2, and discloses a container 20 in a unitary structure having an opening which is normally closed by a plug 23 of any suitable insoluble material to prevent the medicines which may be in liquid or powdered form from escaping before the insoluble materials which form the container, are broken up in the gizzard. The medicines are filled in the chamber 21 in any well known manner after which the inlet opening is plugged.

A further modified form of the invention is shown in Fig. 3, in which an external coating 31 is of such a nature that it is insoluble in the digestive fluids of the throat, crop or glandular stomach. The materials forming the medicine for the destruction of the worms is indicated at 32 and is completely covered by the insoluble coating, thus preventing the medicines from being dissolved before they have reached the gizzard. It is at this point in the digestive tract where the worms usually accumulate so that by the releasing of the medicines in the gizzard the worms will be readily destroyed by the poisonous compounds of the tablet which will have been kept intact when passing through the throat, crop and glandular stomach.

The capsules, container or coating may be formed of ordinary gelatine which is rendered insoluble by the application of a strong solution of formaldehyde for a considerable period of time. In lieu of this method, bichromate of potash may be incorporated in the body of the gelatine coating and then exposing the finished capsule, tablet or pill to the sunlight.

The ordinary gelatine capsules, tablets or pills may be coated with a shellac or some other form of varnish which when dried will provide a hard coating. The coating, container or capsule may be formed of celluloid, wax or other insoluble material or the capsule may possibly be made of glass or such other hard friable material that will be readily broken by the hard particles maintained in a state of agitation by the strong, powerful muscles of the gizzard.

It will be appreciated that the medicines may be in the form of a liquid or a paste or in the form of a powder which are filled into the capsule or container. The container to be effective must be formed of such materials which are insoluble to maintain the medicines against contact with those parts of the digestive tract which would absorb the medicines thereby creating possibly a greater danger to the fowls. It will be seen that the ingredients of the container or coating must not be dissolved in any of the body fluids until it reaches the gizzard where it is ground up, thereby releasing the contents for immediate and direct action through the lower portions of the intestinal tract and where the worms normally infest the anatomy of the fowl. Furthermore, the capsule or coating must be of such a nature that the heat of the body will not cause a breaking down of the walls of the container, and the ingredients forming the container must be impervious to the acids or alkalies of the body fluids, and must also be of sufficient strength to resist the muscular action of the various organs of the body before the containers have reached the gizzard.

I claim:—

A capsule for treating poultry comprising a medicament and a protective covering therefor, said protective covering being unaffected by body heat and insoluble in all the fluids of the body but capable of being fractured by mechanical action in the gizzard, so that the medicament can be released only by the fracture of the protective covering in the gizzard.

Signed at Omaha, in the county of Douglas and State of Nebr., this 21st day of Nov., A. D. 1927.

GEORGE H. LEE.